(12) United States Patent
Klassen et al.

(10) Patent No.: US 8,427,702 B2
(45) Date of Patent: Apr. 23, 2013

(54) PAGE PARALLEL RASTER IMAGE PROCESSING

(75) Inventors: R. Victor Klassen, Webster, NY (US); Peter A. Crean, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 443 days.

(21) Appl. No.: 12/788,417

(22) Filed: May 27, 2010

(65) Prior Publication Data

US 2011/0292412 A1 Dec. 1, 2011

(51) Int. Cl.
*G06F 3/12* (2006.01)
*G06F 9/46* (2006.01)
*G06K 15/00* (2006.01)

(52) U.S. Cl.
USPC ......... 358/1.9; 358/1.13; 358/1.14; 358/1.15; 358/1.16; 718/101; 718/103; 718/104; 718/105; 718/106; 718/107; 718/108

(58) Field of Classification Search .......... None
See application file for complete search history.

(56) References Cited

U.S. PATENT DOCUMENTS

| | | |
|---|---|---|
| 6,817,791 B2 | 11/2004 | Klassen |
| 7,161,705 B2 | 1/2007 | Klassen |
| 2004/0196496 A1 | 10/2004 | Klassen |
| 2004/0196497 A1 | 10/2004 | Klassen |
| 2004/0197124 A1 | 10/2004 | Klassen |
| 2009/0091774 A1* | 4/2009 | Burkes et al. ................ 358/1.13 |
| 2009/0161163 A1 | 6/2009 | Klassen |

OTHER PUBLICATIONS

U.S. Appl. No. 12/624,761, filed Nov. 24, 2009, Klassen.
U.S. Appl. No. 12/467,369, filed May 18, 2009, Klassen.
U.S. Appl. No. 10/606,030, filed Jun. 25, 2003, Klassen.
U.S. Appl. No. 10/408,022, filed Apr. 4, 2003, Klassen.
U.S. Appl. No. 10/606,024, filed Apr. 4, 2003, Klassen.
U.S. Appl. No. 11/961,102, filed Dec. 20, 2007, Klassen.
U.S. Appl. No. 10/407,564, filed Apr. 4, 2003, Klassen.

* cited by examiner

*Primary Examiner* — Benny Q Tieu
*Assistant Examiner* — Haris Sabah
(74) *Attorney, Agent, or Firm* — Fay Sharpe LLP

(57) ABSTRACT

According to an aspect of the disclosure, a printing system is provided comprising a plurality of resources including idle and non-idle resources having a at least one image marking engine. The plurality of resources includes a page parallel RIP system wherein the RIP system supports configurable sized print chunks. The RIP system adaptively adjusts the size of the chunks according to the busyness of receiving RIP nodes.

19 Claims, No Drawings

PAGE PARALLEL RASTER IMAGE PROCESSING

BACKGROUND

In high speed parallel print job processing, two modes are known in the art: one form is known as "page parallel", and the other is known as "job parallel". As described in U.S. Pat. No. 7,161,705, an intermediate form of parallelism is "chunk parallel. Job parallel processing has the advantage of efficiency: if there are enough jobs available, each of a collection of processors may operate on its own job, without interference from the others. Any startup overhead incurred on a per-job basis is incurred only once per job. On the other hand, page parallel operation has the advantage that an individual job is typically completed sooner than in a job parallel system, and the speed advantage of parallelism is available even if there is only one (multi-page) job to print. With chunk parallel printing, chunks of jobs, comprising an integer number of pages, are processed in parallel. With more than one page per chunk, the amount of startup overhead is reduced, while retaining the advantages that multiple processors are active despite there being as few as one job in the system.

Published US patent application number 20040196496 describes a page or "chunk" parallel printing system. The system comprises a printer, a plurality of processing nodes, each processing node being disposed for processing a portion of a print job into a printer dependant format, and a processing manager for spooling the print job into selectively sized chunks and assigning the chunks to selected ones of the nodes for parallel processing of the chunks by the processing nodes into the printer dependant format. The chunks are selectively sized from at least one page to an entire size of the print job in accordance with predetermined splitting factors for enhancing page processing efficiency. The system further comprises a supervisor processor for estimating the work time required to process a chunk based upon selected data determined from the splitting of the print job and for load balancing the print jobs across the processing nodes. Further background information for the present disclosure can be found in U.S. Pat. No. 6,817,791 describing an idiom recognizing document splitter; U.S. Pat. No. 7,161,705, describing a parallel printing system having modes for auto-recovery, auto-discovery of resources, and parallel processing of unprotected postscript jobs; and, US patent publication number 20040196497 describing a parallel printing system having flow control in a virtual disk transfer system. Patent publications 20040196496 and 20040196497, and U.S. Pat. Nos. 6,817,791 and 7,161,705, are incorporated by reference as background information.

INCORPORATION BY REFERENCE

The following co-pending applications, the disclosures of which are also incorporated in their entireties by reference, are mentioned:

U.S. application Ser. No. 12/467,369, filed May 18, 2009, entitled RESOURCE PARTITIONING IN A PRINT SYSTEM by KLASSEN, R. VICTOR; and U.S. application Ser. No. 12/624,761, filed Nov. 24, 2009, entitled PAGE PARALLEL RIP PRINTING METHODS AND SYSTEMS by KLASSEN, R. VICTOR; and, U.S. application Ser. No. 10/606,030, filed Jun. 25, 2003, entitled PARALLEL PRINTING SYSTEM HAVING MODES FOR AUTO-DISCOVERY OF RESOURCES, AND PARALLEL PROCESSING OF UNPROTECTED POSTSCRIPT JOBS by KLASSEN, R. VICTOR; and, U.S. application Ser. No. 10/408,022, filed Apr. 4, 2003, entitled IDIOM RECOGNIZING DOCUMENT SPLITTER by KLASSEN, R. VICTOR; and, U.S. application Ser. No. 10/407,564, filed Apr. 4, 2003, entitled PARALLEL PRINTING SYSTEM by KLASSEN, R. VICTOR; and, U.S. application Ser. No. 10/606,024, filed Jun. 25, 2003, entitled PARALLEL PRINTING SYSTEM HAVING FLOW CONTROL IN A VIRTUAL DISK TRANSFER SYSTEM by KLASSEN, R. VICTOR; and, U.S. application Ser. No. 11/961,102, filed Dec. 20, 2007, entitled PARALLEL RIP WITH PREAMBLE CACHING by KLASSEN, R. VICTOR.

In a page parallel system, a job can be divided into a number of chunks, which are then delivered to RIPs to process into print-ready files. Small chunks provide improved load balancing, and get the system started faster (i.e., it takes less time to generate a chunk for each RIP); large chunks have less overhead (redundant information may be transmitted with each chunk, and the RIP has some amount of startup time). Normally the chunk size is statically selected based on keeping the chunk size as small as possible without paying too large an overhead penalty and/or startup time delay.

SUMMARY

According to an aspect of the disclosure, a printing system is provided comprising a plurality of resources including idle and non-idle resources and having at least one image marking engine. The plurality of resources comprises a page parallel RIP system wherein the RIP system supports configurable sized print chunks. The RIP system adaptively adjusts the size of the chunks according to the busyness of receiving RIP nodes.

According to another aspect of the disclosure, a printing system, with at least one image marking engine, is provided, comprising a plurality of resources including a page parallel RIP system wherein the RIP system supports configurable sized print chunks. The RIP system adaptively adjusts the size of the chunks according to the busyness of receiving RIP nodes. The RIP system calculates the busyness of the nodes according to the aggregate amount of work in progress on each RIP node. The chunk size to be sent to a node is based on the following:

$$\text{Chunk size} = (\min + \text{busyness} \ast (\max - \min)).$$

According to still another aspect of the disclosure, a printing method is provided comprising a plurality of resources including a page parallel RIP system wherein the RIP system supports configurable sized print chunks. The method further comprises tabulating a busyness of receiving RIP nodes according to the aggregate amount of work in progress on each RIP node; adaptively adjusting the size of the chunks according to the busyness of receiving RIP nodes; determining the total number of pages remaining to be processed and if the remaining number of chunks at the currently preferred megabyte size is not larger than the number of RIPs in the system; and, setting the chunk size to a number of pages that most evenly divides the remaining pages among all RIPs in the system.

DETAILED DESCRIPTION

One exemplary arrangement of a multiple page parallel RIP system will be described hereinafter. In a page parallel RIP system, jobs can be sent to, for example, a DocuSP/ FreeFlow spooling mechanism, which can include such features as saving (non-streaming) jobs to disk (for recovery), guessing the language, and extracting job ticket information. A description of the job is passed through various mechanisms to the page parallel RIP supervisor (PPR supervisor), which passes it on to a splitter. In some current systems there can be at least two splitters per language, one for interrupt jobs, and the other for normal jobs. The supervisor is aware of all of the parallel RIP processes available, and can assign chunks of the job to the available RIPs. In steady state, the supervisor maintains a model of the time to complete a chunk based on past experience with each of the RIP nodes (which need not be homogeneous), and various chunk characteristics determined by the splitter and passed to the supervisor. The supervisor assigns chunks to the various RIPs, by sending messages to the splitter, informing it of the chunk destinations, and the splitters then write the chunks of the file directly to the RIPs' file systems and/or memory. To keep the RIPs from needing to wait (or to minimize wait), the supervisor generally assigns chunks before the RIPs are idle, allowing each of them to accumulate a small (1-3 chunk) queue of unstarted work. To keep the splitter from needing to wait, the supervisor can allow the splitter to accumulate a small queue of unstarted work, as well. The queues are kept short so as to keep the estimates of time to completion from being too inaccurate.

As RIPs complete chunks, they can send messages to the supervisor, which forwards them to the collector (the collector can be implemented as a separate process, or as part of the supervisor). The collector maintains a queue of completed chunks for each job, and then reports back completed chunks in the order of job submission, and then page order within the job.

The size of a chunk can be controlled by configuration variables: for example, a chunk is complete at the end of the next page after one of two thresholds is reached—either the number of pages or the number of Mbytes in the chunk exceeds a specified threshold.

In an adaptive system, the values of the thresholds can be varied through communication between the supervisor and the splitter, so that the thresholds can change on a chunk-by-chunk basis.

The size of a chunk can be adaptively adjusted based on how busy a receiving RIP is determined to be. In a system with multiple RIPs sharing the same hardware, the measure of busy can be based on how busy the collection of RIPs on that hardware (i.e. node) is. If the node is not busy, the chunk is made smaller; if it is busy, it is sent a larger chunk. The size of chunk can either alternate between two sizes, or be varied over the full range of page counts between a fixed maximum and a fixed minimum. Smaller chunks can be sent when RIPs are less busy to reduce the risk that they might run out of work while their next chunk is being generated. If the total number of pages remaining is known, and the remaining number of chunks at the currently-preferred size is not larger than the number of RIPs in the system, the chunk size can be set to a number of pages that most evenly divides the remaining pages among all RIPs in the system.

The choice of threshold can be a compromise. Small chunks provide improved load balancing, and get the system started faster (it takes less time to generate a small chunk for each RIP); large chunks have less overhead (redundant information may be transmitted with each chunk, and the RIP has some amount of startup time). Normally the chunk size is statically selected based on keeping the chunk size as small as possible without paying too large an overhead penalty.

Implementations can be strictly Symmetric Multi-Processor (SMP) or distributed, or a combination. In a strictly SMP configuration, processes can operate in the same physical box, which have multiple processors, connected on a very fast bus. This provides a level of simplicity, in that various parts of the system that might communicate using shared memory do not have to be modified to communicate across a network, although it increases the complexity of interactions within one box, thereby making performance-related behaviour less predictable. In a strictly distributed configuration, one RIP process can be run on each of a set of network-connected boxes, with other portions of the system (such as the supervisor, collector, and splitters) on one box, either shared with one of the RIP processes, or on their own. In a combined system, multiple RIP processes operate in each of multiple network-connected boxes, with other portions of the system behaving as for a strictly distributed system.

To be described in detail hereinafter, rather than have the chunk size controlled statically via a configuration variable, two configuration variables can be used to control the maximum and minimum chunk size. These variables may explicitly set the minimum and maximum, or one might set the minimum, while the other is a multiplier used as a scale factor to determine the maximum.

The size of a chunk can be adaptively adjusted based on how busy the receiving RIP is. In a system with multiple RIPs sharing the same hardware, the measure of busy can be based on the busyness of the collection of RIPs on that hardware (node). If the node is not busy, the chunk is made smaller; if it is busy, it is sent a larger chunk. It is to be appreciated that a chunk can be an integer number of pages.

In the simplest configuration, a non-busy node can receive a minimum sized chunk, while a busy node can receive a maximum sized chunk. In a slightly more sophisticated configuration, nodes have a measure of "busyness", where a node with no chunks in their queue(s) can have a busyness of 0, while nodes with full queues on all of their RIPs can have a busyness of 1.0. The size of a chunk to be sent to a node can be expressed by equation (1) as follows:

$$\text{Chunk size}=(\min+\text{busyness}*(\max-\min)). \quad (1)$$

In a strictly distributed system, the busyness formula is given by the sum of the chunk sizes in the queue, divided by the product of the maximum queue length and the maximum chunk size, that is, equation (2) as follows:

$$\text{Distributed Busyness}=(\text{all chunks in queue chunk size})/(\text{max chunk size} \times \text{max queue length}). \quad (2)$$

In an SMP or hybrid system, the busyness formula can be calculated for an entire node, and then for each RIP on that node. The node busyness formula is given by the sum of Distributed Busyness values given by equation (2), and then divided by the number of RIPs on that node. That is:

$$\text{NodeBusyness}=(\text{all RIPs on node Distributed Busyness})/(\text{max RIPs per node}). \quad (3)$$

The RIP busyness in a hybrid or SMP system can then be determined as Distributed Busyness for that RIP multiplied by NodeBusyness for the node on which that RIP is running.

Some languages make it easy to determine the number of pages in a job, without completely scanning the job. PDF is one good example of such a language. For such a language, as one approaches the end of the job it would be efficient to ensure that the remaining portion of the job is spread evenly across the available nodes. If there are enough RIPs available that the remainder of the job can be completed with no more than one chunk per node, the remainder of the job can be divided evenly across the available nodes. For highly parallel systems, and moderate length jobs, this can be accomplished at the start of the job.

The more typical case will be one in which the end of a job is approached when the various nodes are busy, but with variability in the busyness of the nodes. In this case, once the sum of the otherwise-calculated chunk sizes for the available nodes is no greater than the remaining size of the job, the chunk sizes as calculated according to equation (1) are multiplied by a scale factor which is the quotient formed by the sum of the chunk sizes as calculated according to equation (1) as numerator over the remaining size of the job.

In the aforementioned system, the supervisor can maintain a model of RIP speed for each RIP based on readily measured parameters of the chunk, such as page count and size in Mbytes. The supervisor uses this model to send a chunk to the RIP expected to be ready first. An enhancement suggested as part of the current invention is to break ties by sending work in order of increasing busyness. Ties are unlikely to occur except when one or more RIPs are idle. When this does happen, the busyness formula will favor sending work to RIPs on different nodes, rather than loading up one node first, and then another. So long as the busyness formula is sufficiently simple, the splitter can calculate the busyness of all the nodes; the supervisor can include in a chunk destination the expected time that node is to become idle, and then the splitter can use that information along with its calculated busyness values to re-order its queue when necessary.

One aspect of the above described disclosure provides that in a page parallel RIP system supporting configurable-sized chunks, the system varies the size of the chunks according to the busyness of the receiving RIP node. It is expected that one embodiment of the system would reduce the size of the chunks when RIP nodes are less busy, so as to be able to get more chunks going. Further refinements include calculating busyness according to the aggregate amount of work in progress on a physical RIP node, spreading and dividing the remainder of a job—when it becomes short enough—among the available RIP nodes, and sending chunks to less busy nodes, when multiple nodes have the same or similar queue sizes.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:
a plurality of resources including idle and non-idle resources;
at least one image marking engine;
said plurality of resources including a page parallel RIP system wherein said RIP system supports configurable-sized print chunks;
said RIP system adaptively adjusts the size of said chunks according to a busyness of receiving RIP nodes;
wherein said RIP system calculates said busyness of said nodes according to the aggregate amount of work in progress on each node;
wherein each receiving RIP node receives a relatively smaller said chunk if less busy, and a relatively larger said chunk if more busy;
said chunk size to be sent to a node is based on the following:

chunk size=(minimum set chunk size+(busyness×(maximum set chunk size−minimum set chunk size))); and, wherein busyness comprises a scale from 0.0 to 1.0.

2. The system of claim 1, wherein said RIP system reduces the size of said chunks when the RIP nodes are less busy.

3. The system of claim 2, wherein said RIP system increases the size of said chunks when the RIP nodes are more busy.

4. The system of claim 1, wherein said RIP system divides a remainder of a job among the available said RIP nodes and sends said chunks to less busy nodes when multiple nodes have the same or similar queue size.

5. The system of claim 4, wherein said RIP system maintains a model of RIP speed for each RIP based on measured parameters of the chunk.

6. The system of claim 5, wherein the parameters are selected from the group consisting of page count and chunk size in Mbytes.

7. The system of claim 6, wherein each said chunk is an integer number of pages.

8. A printing system with at least one image marking engine comprising:
a plurality of resources including a page parallel RIP system wherein said RIP system supports configurable-sized print chunks;
said RIP system adaptively adjusts the size of said chunks according to a busyness of receiving RIP nodes;
said RIP system calculates said busyness of said nodes according to the aggregate amount of work in progress on each RIP node; and,
said chunk size to be sent to a node is based on the following:

chunk size=(minimum set chunk size+(busyness×(maximum set chunk size−minimum set chunk size))); and, wherein busyness comprises a scale from 0.0 to 1.0.

9. The system of claim 8, wherein said RIP system divides a remainder of a job among the available said RIP nodes and sends said chunks to less busy nodes when multiple nodes have the same or similar queue size.

10. The system of claim 9, wherein said RIP system maintains a model of RIP speed for each RIP based on measured parameters of the chunk.

11. The system of claim 10, wherein the parameters are selected from the group consisting of page count and chunk size in Mbytes.

12. The system of claim 11, wherein each said chunk is an integer number of pages.

13. A printing method comprising:
providing a plurality of print resources including a page parallel RIP system and receiving RIP nodes wherein said RIP system supports configurable-sized print chunks;
calculating a busyness of receiving RIP nodes according to the aggregate amount of work in progress on each RIP node;
adaptively adjusting the size of said chunks according to a busyness of receiving RIP nodes;
determining the total number of pages remaining to be processed and if the remaining number of chunks at the currently preferred Mbyte size is not larger than the number of RIPs in the system;
setting the chunk size to a number of pages that most evenly divides the remaining pages among all RIPs in the system;

calculating the sum of the calculated chunk sizes for the available nodes and comparing to the remaining size of the job and when said sum is less than the remaining size of the job; and, multiplying the chunk sizes by a scale factor which is a quotient formed by the sum of the chunk sizes as calculated according to:

chunk size=(minimum set chunk size+(busyness×(maximum set chunk size−minimum set chunk size))); and, wherein busyness comprises a scale from 0.0 to 1.0.

14. The method of claim 13, further comprising reducing the size of said chunks when the RIP nodes are less busy.

15. The method of claim 13, further comprising increasing the size of said chunks when the RIP nodes are more busy.

16. The method of claim 13, further comprising dividing a remainder of a job among the available said RIP nodes and sending said chunks to less busy nodes when multiple nodes have the same or similar queue size.

17. The method of claim 16, further comprising maintaining a model of RIP speed for each RIP based on measured parameters of the chunk.

18. The method of claim 17, wherein the parameters are selected from the group consisting of page count and chunk size in Mbytes.

19. The method of claim 13, wherein each said chunk is an integer number of pages.

* * * * *